United States Patent
Katayama et al.

(10) Patent No.: US 9,888,036 B2
(45) Date of Patent: Feb. 6, 2018

(54) MESSAGE SENDING DEVICE, MESSAGE RECEIVING DEVICE, MESSAGE CHECKING METHOD, AND RECORDING MEDIUM

(71) Applicant: FUJITSU LIMITED, Kawasaki-shi, Kanagawa (JP)

(72) Inventors: Yoshinori Katayama, Kawasaki (JP); Hiroshi Tsuda, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 14/615,166

(22) Filed: Feb. 5, 2015

(65) Prior Publication Data

US 2015/0264085 A1    Sep. 17, 2015

(30) Foreign Application Priority Data

Mar. 14, 2014   (JP) .................................. 2014-052557

(51) Int. Cl.
*H04L 29/06*     (2006.01)
*H04L 12/58*     (2006.01)
*G06F 21/32*     (2013.01)

(52) U.S. Cl.
CPC .......... *H04L 63/1483* (2013.01); *G06F 21/32* (2013.01); *H04L 51/08* (2013.01); *H04L 51/12* (2013.01)

(58) Field of Classification Search
CPC ..... H04L 51/08; H04L 51/12; H04L 63/1483; G06F 21/32; G06F 21/316
See application file for complete search history.

(56) References Cited

U.S. PATENT DOCUMENTS

| | | | |
|---|---|---|---|
| 7,706,574 B1 | 4/2010 | Ross | |
| 2003/0195935 A1* | 10/2003 | Leeper | G06F 21/32 709/206 |
| 2008/0084972 A1* | 4/2008 | Burke | G06Q 10/107 379/88.02 |
| 2008/0092209 A1* | 4/2008 | Davis | G06F 21/32 726/2 |
| 2009/0077617 A1* | 3/2009 | Levow | H04L 51/12 726/1 |
| 2013/0198860 A1 | 8/2013 | Guo et al. | |

FOREIGN PATENT DOCUMENTS

| | | |
|---|---|---|
| JP | 2000-172296 | 6/2000 |
| JP | 2009-175984 | 8/2009 |

(Continued)

OTHER PUBLICATIONS

Extended European Search Report dated Aug. 10, 2015 in corresponding European Patent Application No. 15153598.6.

(Continued)

*Primary Examiner* — Tri Tran
(74) *Attorney, Agent, or Firm* — Staas & Halsey LLP

(57) ABSTRACT

A message sending device includes a processor that executes a process. The process includes: obtaining an operation characteristic during creating a message; adding, to the message, the operation characteristic obtained at the obtaining; and sending the message, to which the operation characteristic has been added at the adding, to a destination of the message.

6 Claims, 17 Drawing Sheets

KEYBOARD

CHARACTERISTIC PHRASES IN EMAIL TEXT TO USER A, SPECIFICITY INFORMATION

| | |
|---|---|
| 1: TO WHOM IT MAY CONCERN | 0.5 |
| 2: YOUR SUPPORT IS APPRECIATED | 0.75 |
| 3: TO MR. TANAKA (DEPARTMENT MANAGER) | 0.3 |
| 4: THIS IS A FROM THE SECURITY DEPARTMENT | 0.25 |
| 5: BEST REGARDS | 0.65 |
| 6: ··· | 0.00··· |

(56) References Cited

FOREIGN PATENT DOCUMENTS

WO     WO 01/63386 A1    8/2001
WO     WO 2007/146437 A2    12/2007

OTHER PUBLICATIONS

Solami et al., "User-Representative Feature Selection for Keystroke Dynamics", Network and System Security, IEEE, Sep. 6, 2011, pp. 229-233.
Japanese Office Action dated Aug. 1, 2017 in related Japanese Application No. 2014-052557.
European Communication dated Aug. 29, 2017 for related European Application No. 15 153 598.6.
Japanese Office Action dated Nov. 21, 2017 in related Japanese Application No. 2014-052557.

* cited by examiner

FIG.3

| DESTINATION | STATE NUMBER | CHARACTERISTIC PHRASE |
|---|---|---|
| 31 | | |

FIG.4

| DATE | TIME | OPERA-TION | CODE INFORMATION |
|---|---|---|---|
| 2013/11/22 | 9:28:35 | KeyUp : | KeyCode [83], ScanCode [31], Flags [128], |
| 2013/11/22 | 9:28:35 | KeyDown | : KeyCode [85], ScanCode [22], Flags [0], |
| 2013/11/22 | 9:28:35 | KeyUp : | KeyCode [85], ScanCode [22], Flags [128], |
| 2013/11/22 | 9:28:35 | KeyDown | : KeyCode [32], ScanCode [57], Flags [0], |
| 2013/11/22 | 9:28:35 | KeyUp : | KeyCode [32], ScanCode [57], Flags [128], |
| 2013/11/22 | 9:28:37 | KeyDown | : KeyCode [13], ScanCode [28], Flags [0], |
| 2013/11/22 | 9:28:37 | KeyUp : | KeyCode [13], ScanCode [28], Flags [128], |
| 2013/11/22 | 9:28:37 | KeyDown | : KeyCode [74], ScanCode [36], Flags [0], |
| 2013/11/22 | 9:28:37 | KeyUp : | KeyCode [74], ScanCode [36], Flags [128], |
| 2013/11/22 | 9:28:37 | KeyDown | : KeyCode [89], ScanCode [21], Flags [0], |
| 2013/11/22 | 9:28:38 | KeyUp : | KeyCode [89], ScanCode [21], Flags [128], |
| 2013/11/22 | 9:28:38 | KeyDown | : KeyCode [79], ScanCode [24], Flags [0], |
| 2013/11/22 | 9:28:38 | KeyDown | : KeyCode [85], ScanCode [22], Flags [0], |
| 2013/11/22 | L1 9:28:38 | KeyUp : | KeyCode [79], ScanCode [24], Flags [128], |
| 2013/11/22 | 9:28:38 | KeyUp : | KeyCode [85], ScanCode [22], Flags [128], |
| 2013/11/22 | 9:28:38 | KeyDown | : KeyCode [72], ScanCode [35], Flags [0], |
| 2013/11/22 | 9:28:38 | KeyUp : | KeyCode [72], ScanCode [35], Flags [128], |
| 2013/11/22 | 9:28:38 | KeyDown | : KeyCode [79], ScanCode [24], Flags [0], |
| 2013/11/22 | 9:28:38 | KeyDown | : KeyCode [85], ScanCode [22], Flags [0], |
| 2013/11/22 | 9:28:38 | KeyUp : | KeyCode [79], ScanCode [24], Flags [128], |
| 2013/11/22 | L2 9:28:38 | KeyDown | : KeyCode [32], ScanCode [57], Flags [0], |
| 2013/11/22 | 9:28:38 | KeyUp : | KeyCode [85], ScanCode [22], Flags [128], |
| 2013/11/22 | 9:28:38 | KeyUp : | KeyCode [32], ScanCode [57], Flags [128], |
| 2013/11/22 | 9:28:39 | KeyDown | : KeyCode [13], ScanCode [28], Flags [0], |
| 2013/11/22 | 9:28:39 | KeyUp : | KeyCode [13], ScanCode [28], Flags [128], |

FIG.5

| DATE | TIME | MOUSE | OPERA-TION | OPERATION PARTICULARS | |
|---|---|---|---|---|---|
| 2013/11/22 | 9:29:15 | Mouse | Move | (492, 76) | |
| 2013/11/22 | 9:29:15 | Mouse | Move | (494, 72) | |
| 2013/11/22 | 9:29:15 | Mouse | Move | (494, 70) | |
| 2013/11/22 | 9:29:15 | Mouse | Move | (495, 68) | |
| 2013/11/22 | 9:29:16 | Mouse | Move | (496, 54) | |
| ~~2013/11/22~~ | ~~9:29:16~~ | ~~Mouse~~ | ~~Move~~ | ~~(496, 54)~~ | L3 |
| 2013/11/22 | 9:29:16 | Mouse | Click | [Left] | |
| 2013/11/22 | 9:29:16 | Mouse | Move | (496, 53) | |
| 2013/11/22 | 9:29:16 | Mouse | Move | (496, 53) | |
| 2013/11/22 | 9:29:16 | Mouse | Move | (498, 52) | |
| 2013/11/22 | 9:29:17 | Mouse | Move | (1117, 27) | |
| 2013/11/22 | 9:29:17 | Mouse | Move | (1117, 27) | |
| 2013/11/22 | 9:29:17 | Mouse | Move | (1117, 26) | |
| 2013/11/22 | 9:29:17 | Mouse | Move | (1117, 25) | |
| ~~2013/11/22~~ | ~~9:29:17~~ | ~~Mouse~~ | ~~Move~~ | ~~(1117, 25)~~ | L4 |
| 2013/11/22 | 9:29:17 | Mouse | Click | [Left] | |
| 2013/11/22 | 9:29:17 | Mouse | Move | (1116, 25) | |
| 2013/11/22 | 9:29:17 | Mouse | Move | (1115, 25) | |
| 2013/11/22 | 9:29:17 | Mouse | Move | (1113, 25) | |
| 2013/11/22 | 9:29:18 | Mouse | Move | (445, 20) | |
| 2013/11/22 | 9:29:18 | Mouse | Move | (442, 19) | |
| 2013/11/22 | 9:29:19 | Mouse | Click | [Left]            (442, 19) | |
| 2013/11/22 | 9:29:24 | Mouse | Move | (442, 18) | |
| 2013/11/22 | 9:29:24 | Mouse | Move | (443, 19) | |

FIG.7

BEHAVIOR CHARACTERISTIC TABLE (31)

| DESTINATION | STATE NUMBER | CHARACTERISTIC PHRASE | INPUT PATTERN |
|---|---|---|---|
| A | 1 | TO WHOM IT MAY CONCERN | KEY STROKE COUNT xxx, xyz [sec], BS-2, enter-1 |
| | 2 | TO MR. TANAKA (DEPARTMENT MANAGER) | KEY STROKE COUNT yyy, xyxx [sec], BS-1, Space-2, enter-2 |
| | 3 | YOUR SUPPORT IS APPRECIATED | KEY STROKE COUNT zzz, yyz [sec], Space-1, enter-1 |
| | 4 | BEST REGARDS | KEY STROKE COUNT xzz, zzy [sec], BS-2, Space-2, enter-2 |
| | 5 | CLICK OK BUTTON | CLICK POSITION (xx, yy), |
| B | 1 | THIS IS XX | KEY STROKE COUNT yyx, zzyy [sec], BS-1, enter-1 |
| | 2 | COULD YOU PLEASE | KEY STROKE COUNT yzy, zyyx [sec], Space-1, enter-2 |
| | 3 | CLICK OK BUTTON | CLICK POSITION (nnn, mmm), |
| | 4 | YOUR CONTINUED SUPPORT IS APPRECIATED | KEY STROKE COUNT yxz, zxy [sec], BS-2, Space-2, enter-2 |
| | 5 | SEE YOU LATER | KEY STROKE COUNT yyy, xzx [sec], BS-1, enter-1 |
| ... | ... | | |

| STATE NUMBER | CHARACTERISTIC VALUE |
|---|---|
| 1 | 0.50 |
| 2 | 0.58 |
| 3 | 0.25 |
| 4 | 0.45 |
| 5 | 0.68 |

MESSAGE SENDING DEVICE, MESSAGE RECEIVING DEVICE, MESSAGE CHECKING METHOD, AND RECORDING MEDIUM

CROSS-REFERENCE TO RELATED APPLICATION

This application is based upon and claims the benefit of priority of the prior Japanese Patent Application No. 2014-052557, filed on Mar. 14, 2014, the entire contents of which are incorporated herein by reference.

FIELD

The embodiments discussed herein are related to a message sending device, a message receiving device, a message sending program, a message receiving program, and a message checking method.

BACKGROUND

In recent years, there is an increasing number of cyber attacks aiming at stealing information. Such cyber attacks include targeted email attack using emails, for example. Such a targeted email attack uses an email of which the From field and the body text are spoofed to make it look like one from a friend, for example.

A technique as follows has been used as a countermeasure against attacks from unauthorized users such as targeted emails as described above. For example, when a user accesses a server by operating a terminal connected to the network, the user is requested to input an ID (identification) and a password so as to obtain habitual information such as, for example, the average keyboard typing speed when inputting the ID and the password. Then, the obtained habitual information, in addition to the ID and the password, is compared with pre-registered habitual information of an authorized user, so as to detect an access from an unauthorized user. There is also a technique where, for example, the sender attaches a speech feature pattern obtained by uttering a password to an electronic mail, and the receiver of the electronic mail compares the speech feature pattern with a pre-received reference speech feature pattern of the sender himself/herself so as to determine if the sender is authentic.

Patent Document 1: Japanese Laid-open Patent Publication No. 2009-175984, and Patent Document 2: Japanese Laid-open Patent Publication No. 2000-172296 are introduced as the Related Art Document.

With the related techniques, however, a user has to take a special action, such as to input an ID and a password, or to utter a password, thereby increasing the burden on the user.

SUMMARY

According to an aspect of the embodiments, a message sending device includes a processor that executes a process including: obtaining an operation characteristic during creating a message; adding, to the message, the operation characteristic obtained at the obtaining; and sending the message, to which the operation characteristic has been added at the adding, to a destination of the message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a data configuration of a behavior characteristic table;

FIG. 4 is a diagram illustrating an example of a keyboard-related operation log;

FIG. 5 is a diagram illustrating an example of a mouse-related operation log;

FIG. 7 is a diagram illustrating an example of an operation characteristic;

DESCRIPTION OF EMBODIMENTS

Preferred embodiments will be explained with reference to accompanying drawings. Note that these embodiments are not to limit the scope of the invention. Moreover, the embodiments can be combined with one another as necessary as long as the processes will not be contradictory.

[a] First Embodiment

System Configuration

Figure 1:
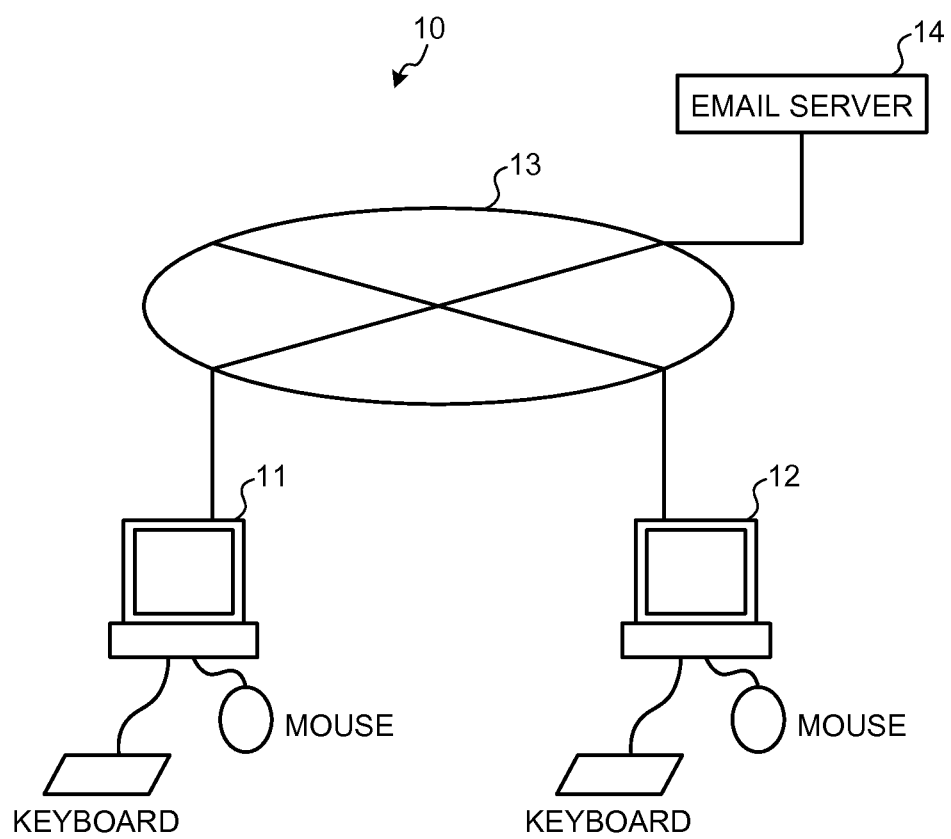
FIG. 1 is a diagram illustrating an example of a schematic configuration of a system as a whole.

First, a system 10 for sending/receiving messages will be described. FIG. 1 is a diagram illustrating an example of a schematic configuration of a system as a whole. As illustrated in FIG. 1, in the system 10, a message sending device 11 and a message receiving device 12 are connected to each other so that they can communicate with each other via a network 13. The message sending device 11 and the message receiving device 12 can exchange messages via the network 13. One form of the network 13 may be any communications network, wired or wireless. For example, the network 13 may be the Internet, a Local Area Network (LAN), a Virtual Private Network (VPN), or the like. The present embodiment is directed to an example where an electronic mail is sent/received as a message. An electronic mail will be hereinafter referred to also as an email. The network 13 is provided with an email server 14. The email server 14 stores emails sent to the email address of a user, and sends stored emails to a requester in response to an email receiving request. The present embodiment is directed to a case where an email sent from the message sending device 11 is stored by the email server 14, and the stored email is sent to the message receiving device 12 in response to an email receiving request from the message receiving device 12.

The message sending device 11 is a device that a user uses for sending an email. The message sending device 11 may be an information processing device such as a desktop type Personal Computer (PC) or a notebook type PC, for example. The message sending device 11 may be a portable terminal device such as a tablet terminal, a smartphone, or a Personal Digital Assistant (PDA), for example. The present embodiment is directed to an example where the message sending device 11 is a desktop type PC. The message sending device 11 has an input unit for inputting a message. For example, in the example of FIG. 1, the message sending device 11 includes a keyboard and a mouse as input units.

The message receiving device 12 is a device that a user uses for receiving emails. The message receiving device 12 may be an information processing device such as a desktop type PC or a notebook type PC, for example. The message receiving device 12 may be a portable terminal device such as a tablet terminal, a smartphone, or a PDA, for example. The present embodiment is directed to an example where the message receiving device 12 is also a desktop type PC. The message receiving device 12 includes an input unit for inputting a message. For example, in the example of FIG. 1, the message receiving device 12 includes a keyboard and a mouse as input units.

Note that while the example of FIG. 1 illustrates a case where there is one message sending device 11 and one message receiving device 12, the system disclosed herein is not limited to this, and there may be any number of message sending devices 11 and any number of message receiving devices 12.

Configuration of Message Sending Device

Figure 2:
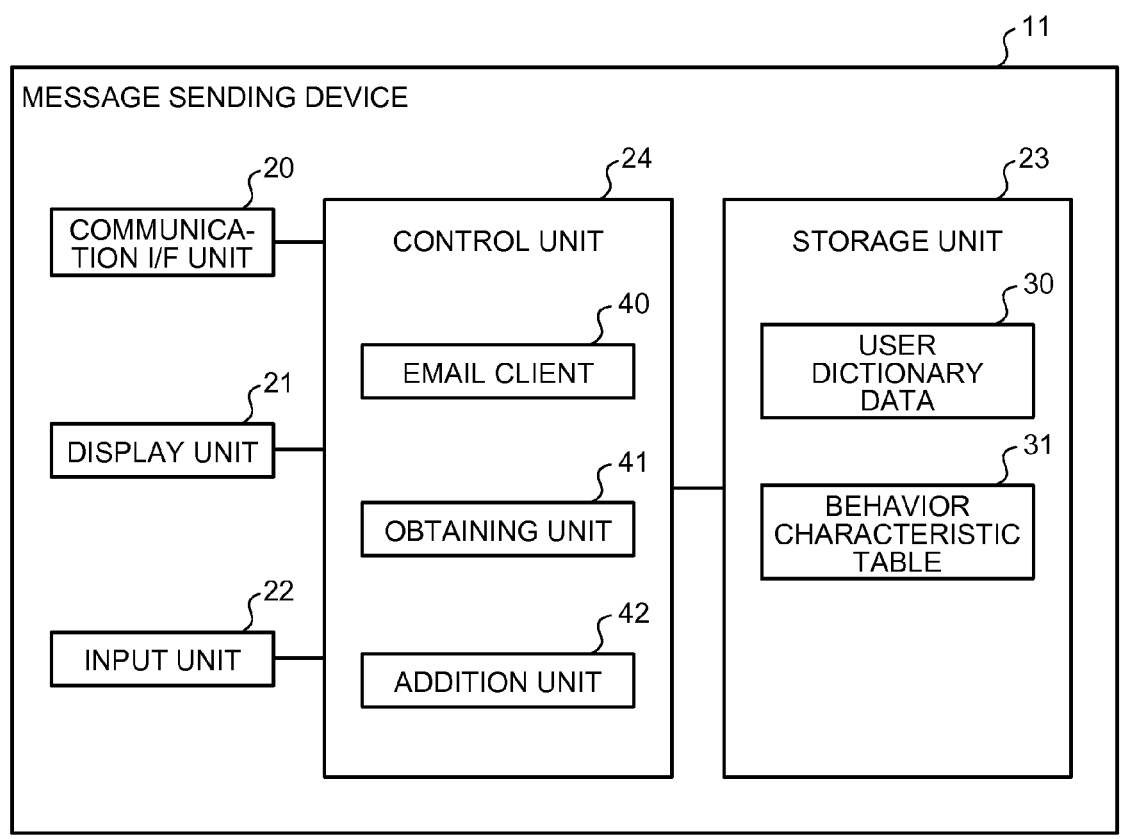
FIG. 2 is a diagram illustrating an example of a functional configuration of a message sending device.

Next, the message sending device 11 according to the first embodiment will be described. FIG. 2 is a diagram illustrating an example of a functional configuration of the message sending device. As illustrated in FIG. 2, the message sending device 11 includes a communication interface (I/F) unit 20, a display unit 21, an input unit 22, a storage unit 23, and a control unit 24.

The communication I/F unit 20 is an interface responsible for controlling communications with other devices. The communication I/F unit 20 sends/receives various information to/from other devices via the network 13. For example, the communication I/F unit 20 sends/receives various data regarding an email to/from the email server 14. A network interface card such as a LAN card may be employed as the communication I/F unit 20.

The display unit 21 is a display device for displaying various information. The display unit 21 may be a display device such as a Liquid Crystal Display (LCD) or a Cathode Ray Tube (CRT). The display unit 21 displays various information. For example, the display unit 21 displays an email operation screen for performing various operations regarding emails such as sending/receiving emails.

The input unit 22 is an input device for inputting various information. For example, the input unit 22 may be an input device such as a mouse or a keyboard. The input unit 22 accepts an operation input from a user, and inputs, to the control unit 24, operation information representing the content of the accepted operation. For example, the input unit 22 accepts various operations regarding emails on the email operation screen such as sending and receiving emails.

The storage unit 23 is a semiconductor memory device such as a flash memory, or a storage device such as a hard disk or an optical disc. Note that the storage unit 23 may be a semiconductor memory on which data can be overwritten, such as a Random Access Memory (RAM) or a flash memory.

The storage unit 23 stores an Operating System (OS) and various programs to be executed by the control unit 24. The storage unit 23 further stores various data to be used by programs executed by the control unit 24. For example, the storage unit 23 stores user dictionary data 30 and a behavior characteristic table 31.

The user dictionary data 30 is data storing character strings such as words and phrases that have been registered by a user. For example, the user dictionary data 30 includes character strings such as words and phrases that have been registered by the user himself/herself using software for assisting in inputting non-alphabet characters, such as Japanese characters, on a computer, for example, Input Method Editor (IME).

The behavior characteristic table 31 is data storing information regarding an operation characteristic of a user creating an email. For example, the behavior characteristic table 31 stores, for each steady state to be described later, information regarding an operation characteristic of a user.

FIG. 3 is a diagram illustrating an example of a data configuration of a behavior characteristic table. A table in which items such as destinations, state numbers, and characteristic phrases are associated with one another may be employed as the behavior characteristic table 31. The item 'destination' is an area for storing information representing the destination of the email. The item 'state number' is an area for storing identification information for identifying an operation characteristic. In order to identify operation characteristics from one another, a unique identification number is given to each operation characteristic. The identification number given to the operation characteristic is stored in the item 'state number.' The item 'characteristic phrase' is an area for storing a phrase of a steady state. Examples of data for the behavior characteristic table 31 will be described later.

The control unit 24 is a device for controlling the message sending device 11. An electronic circuit such as a Central Processing Unit (CPU) or a Micro Processing Unit (MPU), or an integrated circuit such as an Application Specific Integrated Circuit (ASIC) or a Field Programmable Gate Array (FPGA) may be employed as the control unit 24. The control unit 24 includes an internal memory for storing programs defining various process procedures and control data, and various processes are performed based on these programs and control data. The control unit 24 runs various programs, thereby functioning as various processing units. For example, the control unit 24 runs an email client 40. The control unit 24 includes an obtaining unit 41 and an addition unit 42.

The email client 40 is application software for creating, sending and receiving emails, and storing and managing the received emails. For example, the email client 40 displays an email operation screen on the display unit 21, thereby enabling various operations regarding emails, such as sending and receiving emails. Note that while the present embodiment is directed to a case where emails are sent by the email client 40, the present invention is not limited to this. For example, a sending unit may be provided for sending emails without using the email client 40.

The obtaining unit 41 is a processing unit for performing various obtaining operations. For example, the obtaining unit 41 obtains an operation log recording how a user has operated the message sending device 11. For example, the obtaining unit 41 obtains an operation log recording how a user has operated the mouse and the keyboard. For example, this operation log may be obtained by the obtaining unit 41 monitoring operation events accepted by the OS. For example, the operation log may be obtained by using software for outputting an operation log recording operation events that have been accepted by the OS.

FIG. 4 is a diagram illustrating an example of a keyboard-related operation log. Items of 'date,' 'time,' 'operation,' and 'code information' are provided in FIG. 4. The item 'date' is an area for storing the date when a key operation is performed. The item 'time' is an area for storing the time when a key operation is performed. The item 'operation' is an area for storing the key operation performed. "KeyDown" indicates that a key has been depressed. "KeyUp" indicates that a depressed key has been released. 'Code information' is an area for storing a key code, etc., representing the depressed key.

The example of FIG. 4 indicates that a key whose KeyCode is "83" was depressed at time "9:28:35" on date "2013/11/22". Now, a user may have "KeyDown" and "KeyUp" switched around for some keys. For example, in the section denoted by broken line L1, the key of KeyCode "85" is depressed after the key of KeyCode "79" is depressed. Then, in the section denoted by broken line L1, the key of KeyCode "79" is released, and the key of KeyCode "85" is released. Thus, in the section denoted by broken line L1, KeyCode "85" is depressed before the key of KeyCode "79" is released. In the section denoted by broken line L2, the key of KeyCode "85" is depressed after the key of KeyCode "79" is depressed. In the section denoted by broken line L2, the key of KeyCode "32" is depressed after the key of KeyCode "79" is released. In the section denoted by broken line L2, the key of KeyCode "32" is released after the key of KeyCode "85" is released. Thus, in the section denoted by broken line L2, KeyCode "85" is depressed before the key of KeyCode "79" is released. Thus, in the section denoted by broken line L2, KeyCode "32" is depressed before the key of KeyCode "85" is released. If a user makes key inputs as described above, "KeyDown" and "KeyUp" may be switched around for some keys. Particularly, when performing operations involving special keys, a user's operation characteristic is likely to differ significantly from others. These special keys are a group of keys on keyboard other than letters, figures and symbols, including, for example, backspace (BS) key, Delete (Del) key, Space key, Enter key, arrow keys, Home key, Ctrl key, and Shift key. Note that special keys vary depending on the keyboard to be used, and the list is therefore not limited to the above.

FIG. 5 is a diagram illustrating an example of a mouse-related operation log. Items of 'date,' 'time,' 'mouse,' 'operation,' and 'operation particulars' are provided in FIG. 5. The item 'date' is an area for storing the date when a mouse operation is performed. The item 'time' is an area for storing the time when a mouse operation is performed. The item 'mouse' is an area for storing the object operated. For a mouse operation, "Mouse" is stored. The item 'operation' is an area for storing the mouse operation performed. "Move" indicates that a cursor moving operation has been performed. "Click" indicates that a click operation has been performed. The 'operation particulars' is an area for storing information regarding operation particulars. For a cursor moving operation, the 'operation particulars' stores the coordinates of the position within the screen where the cursor has been moved. For a click operation, the 'operation particulars' stores whether the left or right button of the mouse has been clicked, and the coordinates of the position within the screen where the click has been made.

The example of FIG. 5 indicates that the mouse moved to the position of coordinates (492, 76) at time "9:29:15" on date "2013/11/22". The section denoted by broken line L3 indicates that the mouse has been clicked at the position of coordinates (496, 54) at time "9:29:16" on date "2013/11/22". The section denoted by broken line L4 indicates that the mouse has been clicked at the position of coordinates (1117, 25) at time "9:29:17" on date "2013/11/22".

Now, the operation characteristic will be described. Even if users make inputs of the same content, the input operation differs for each user.

For example, even if users make inputs of the same content, there may be differences as to how the keyboard is typed, the mouse operation, the position/size of the window, the operation time, etc. For example, even if users make inputs of the same content, each user differently performs the Kana-Kanji conversion or the operation of converting registered characters, and each user is different in terms of break positions for the Kana-Kanji conversion, keys used for the Kana-Kanji conversion, the total number of key strokes, etc., for example. Even if users make inputs of the same content, the input operation may differ for each user, for example, "KeyDown" and "KeyUp" may be switched around for some keys.

Figure 6:
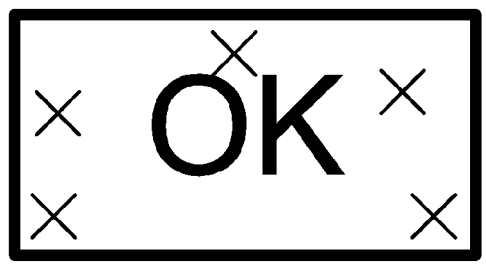
FIG. 6 is a diagram illustrating an example of differences between screen positions at which an operation has been made.

Even if users perform the same operation on the screen, for example, the position of operation differs for each user. Even if users click on, and thereby select, a button on the screen, the position of operation within the button may differ for each user. FIG. 6 is a diagram illustrating an example of differences between screen positions at which an operation is made. In FIG. 6, each "x" indicates positions at which different users make an operation on an OK button.

The obtaining unit 41 obtains, from the operation log, an operation characteristic of an input operation during creating an email. For example, the obtaining unit 41 determines a steady state based on the obtained operation log. The steady state is a state where inputs that are frequently made are being made when creating an email. For example, an email may include a template-like character string, such as a greeting. Moreover, a user registers, in the user dictionary data 30, character strings that the user himself/herself often input. In the present embodiment, the input frequency of each phrase when creating an email is determined and stored in the storage unit 23. Based on the obtained operation log, the obtaining unit 41 determines that it is a steady state if a character string that is input frequently while creating an email is input or if a characteristic phrase such as a character string registered in the user dictionary data 30 is input. Then, from an operation log recording input operations in a steady state, the obtaining unit 41 obtains an operation characteristic for each steady state. For example, based on the operation log, the obtaining unit 41 extracts a characteristic phrase from a text input including therein a keyword of a high frequency of appearance from among email expressions, or from a text input including therein a special key of a keyboard input, and determines the state number representing the extracted steady state. State numbers are determined so that the same steady state is assigned the same number. That is, when there is a new steady state, such as a new characteristic phrase, the obtaining unit 41 sequentially assigns a new state number. The obtaining unit 41 registers, in the behavior characteristic table 31, information regarding the new steady state.

Then, the obtaining unit 41 obtains, from an operation log, an input pattern corresponding to the steady state. For example, the obtaining unit 41 obtains, from the operation log, an input pattern when a characteristic phrase was input. The obtaining unit 41 obtains an operation characteristic from the obtained input pattern. From the operation log, the obtaining unit 41 also obtains, as an operation characteristic, the position of operation within the button on the screen when instructing to send the email. The operation characteristic may be an input pattern itself or a position of operation itself, or may be what is obtained by subjecting the input pattern or the position of operation to an encryption such as hash, or may be a characteristic value obtained by numerically expressing the operation characteristic through a predetermined conversion. When a plurality of types of operation characteristics of input operations of characteristic phrases are obtained, the operation characteristic may be obtained by combining together the plurality of types of operation characteristics. For example, the operation characteristic may be a combination of values obtained by numerically expressing operation characteristics, where certain digit or digits are used for a certain type of operation characteristic. For example, if the keyboard key stroke count is "11" and the operation time is "22," the operation characteristic may be "022011," with the first to third digits representing the keyboard key strokes, and the fourth to sixth digits representing the operation time.

Now, an example of an operation characteristic will be described. FIG. 7 is a diagram illustrating an example of an operation characteristic. In the example of FIG. 7, the behavior characteristic table 31 describes, for each destination, characteristic phrases in the steady state by using unique state numbers. The example of FIG. 7 illustrates an input pattern obtained from the operation log for each steady state. In the example of FIG. 7, for destination "A," a characteristic phrase "To whom it may concern" is registered while being associated with state number "1." It is also illustrated that when the characteristic phrase "To whom it may concern" was input, the key stroke count was "xxx," the operation time was "xyz [sec]," BS key was depressed "2" times, and Enter key was depressed "1" time. FIG. 7 is a diagram illustrating an example of characteristic values obtained by converting input patterns of state numbers "1" to "6" for destination "A" into operation characteristics. The example of FIG. 7 also illustrates that the characteristic value of the input pattern for state number "1" for destination "A" is "0.50."

The addition unit 42 is a processing unit for performing various addition operations. For example, when an email is sent by the email client 40, the addition unit 42 adds, to the email, the operation characteristic during creating the email to be sent. For example, the addition unit 42 associates the state numbers of a steady state with characteristic values of the steady state during creating the email, and adds it to the header of the email by using a predetermined tag. The email with the state number and the operation characteristic added to the header thereof is sent to the destination by the email client 40.

Configuration of Message Receiving Device

Figure 8:
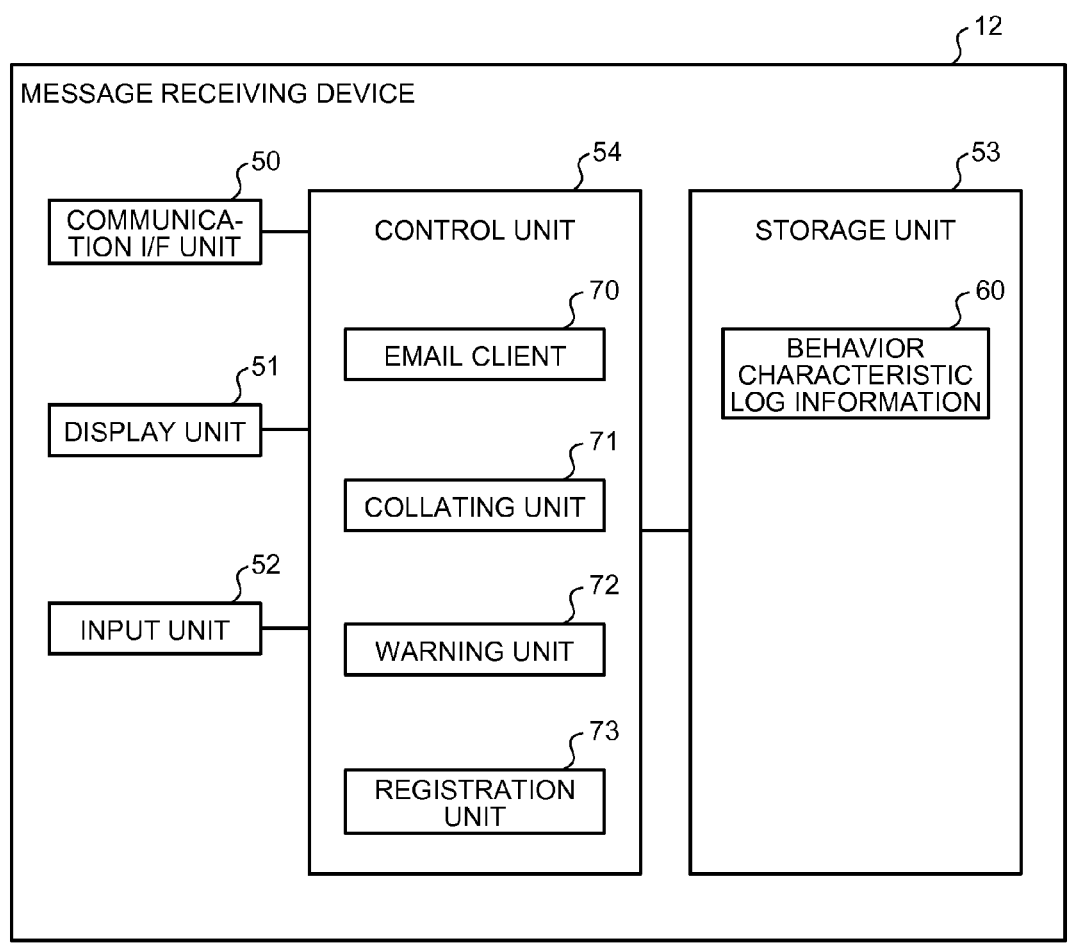
FIG. 8 is a diagram illustrating an example of a functional configuration of a message receiving device.

Next, the message receiving device 12 according to the first embodiment will be described. FIG. 8 is a diagram illustrating an example of a functional configuration of a message receiving device. As illustrated in FIG. 8, the message receiving device 12 includes a communication I/F unit 50, a display unit 51, an input unit 52, a storage unit 53, and a control unit 54.

The communication I/F unit 50 is an interface responsible for controlling communications with other devices. The communication I/F unit 50 sends/receives to/from other devices via the network 13. For example, the communication I/F unit 50 sends/receives various data regarding an email to/from the email server 14. A network interface card such as a LAN card may be employed as the communication I/F unit 50.

The display unit 51 is a display device for displaying various information. The display unit 51 may be a display device such as an LCD or a CRT. The display unit 51 displays various information. For example, the display unit 51 displays an email operation screen for performing various operations regarding emails such as sending/receiving emails.

The input unit 52 is an input device for inputting various information. For example, the input unit 52 may be an input device such as a mouse or a keyboard. The input unit 52 accepts an operation input from a user, and inputs, to the control unit 54, operation information representing the content of the accepted operation. For example, the input unit 52 accepts various operations regarding emails on the email operation screen such as sending and receiving emails.

The storage unit 53 is a semiconductor memory device such as a flash memory, or a storage device such as a hard disk or an optical disc. Note that the storage unit 53 may be a semiconductor memory on which data can be overwritten, such as a RAM or a flash memory.

The storage unit 53 stores an OS and various programs to be executed by the control unit 54. The storage unit 53 further stores various data to be used by programs executed by the control unit 54. For example, the storage unit 53 stores behavior characteristic log information 60.

The behavior characteristic log information 60 is data storing an operation characteristic for each user. For example, the behavior characteristic log information 60 includes information regarding operation characteristics that have been received in the past for each sender.

Figure 9:
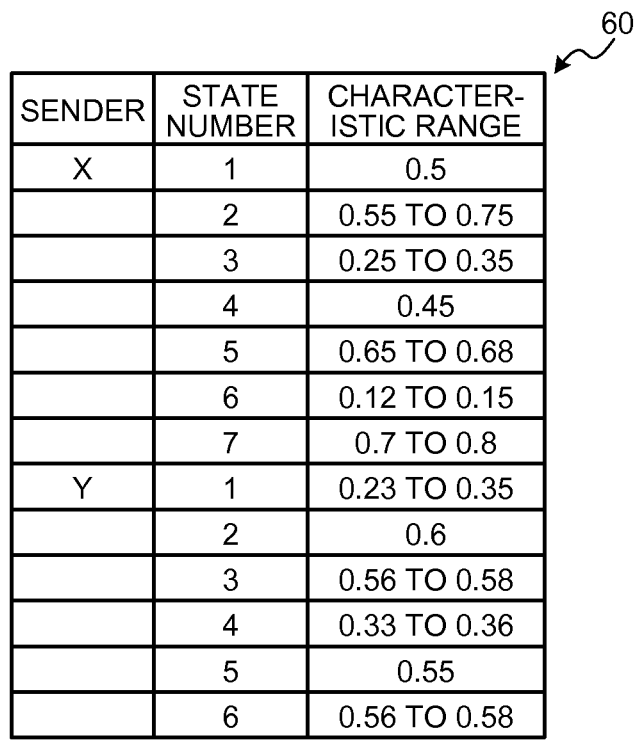
FIG. 9 is a diagram illustrating an example of a data configuration of behavior characteristic log information.

FIG. 9 is a diagram illustrating an example of a data configuration of behavior characteristic log information. A table in which items such as senders, state numbers and characteristic ranges are associated with one another may be employed as the behavior characteristic log information 60. The item 'sender' is an area for storing information representing the sender of the email. The item 'state number' is an area for storing identification information identifying a steady state. The item 'characteristic range' stores the range of operation values that can be considered as those of a valid user. The start and the end of the range may be stored as the characteristic range. The characteristic range may be a specific value. The example of FIG. 9 indicates that for sender "X," the characteristic range for state number "1" is "0.50."

The control unit 54 is a device for controlling the message receiving device 12. An electronic circuit such as a Central Processing Unit (CPU) or a Micro Processing Unit (MPU), or an integrated circuit such as an Application Specific Integrated Circuit (ASIC) or a Field Programmable Gate Array (FPGA) may be employed as the control unit 54. The control unit 54 includes an internal memory for storing programs defining various process procedures and control data, and various processes are performed based on these programs and control data. The control unit 54 runs various programs, thereby functioning as various processing units.

For example, the control unit 54 runs an email client 70. The control unit 54 includes a collating unit 71, a warning unit 72, and a registration unit 73.

The email client 70 is application software for creating, sending and receiving emails, and storing and managing the received emails. For example, the email client 70 displays an email operation screen on the display unit 51, thereby enabling various operations regarding emails, such as sending and receiving emails. Note that while the present embodiment is directed to a case where an email is received by the email client 70, the present invention is not limited to this. For example, a receiving unit may be provided for receiving emails without using the email client 70.

The collating unit 71 is a processing unit for performing various collating operations. For example, the collating unit 71 collates operation characteristics added to the email received by the email client 70 with registered operation characteristics. For example, the collating unit 71 reads out, from the behavior characteristic log information 60, a record of which the item 'sender' is the sender of the email received by the email client 70. The collating unit 71 also reads out each state number and the characteristic value thereof from the header of the email received by the email client 70. Then, for each state number, the collating unit 71 collates by way of comparison the characteristic value of the email received by the email client 70 with the characteristic range of the record read out from the behavior characteristic log information 60, thereby determining if it is valid. For example, the collating unit 71 determines that the characteristic value added to the header of the email is valid if the characteristic value is within the characteristic range stored in the behavior characteristic log information 60.

The warning unit 72 is a processing unit for performing various warning operations. For example, the warning unit 72 issues a warning depending on the collation result of the collating unit 71. For example, if the characteristic value of each state number added to the email is outside the characteristic range, the warning unit 72 determines that it is an email from an invalid user and displays a warning message on the display unit 51.

The registration unit 73 is a processing unit for performing various registration operations. For example, the registration unit 73 registers data in the behavior characteristic log information 60. For example, in the present embodiment, the screen in which a warning message is displayed includes a button that allows the user to indicate that the sender of the email is valid. If the button for indicating that the sender is valid is selected, the registration unit 73 registers the characteristic range for each state number in the behavior characteristic log information 60 so that the characteristic value for each state number added to the received email is within the characteristic range. Thus, when an email is later received with the same operation characteristic, it is determined to be from a valid user. Note that the characteristic range may be registered with a predetermined margin with respect to the characteristic value. For example, it may be registered with a margin of a predetermined value or a predetermined proportion with respect to the characteristic value. For example, when the operation characteristic is a combination of values obtained by numerically converting operation characteristics where a digit is assigned to each type of operation characteristic, the characteristic range may be determined for each digit. For example, when the operation characteristic is "022011," with the first to third digits representing the keyboard key stroke count "11" and the fourth to sixth digits representing the operation time "22," the characteristic range is registered separately for the first to third digits and for the fourth to sixth digits.

Operation of System

Figure 10:
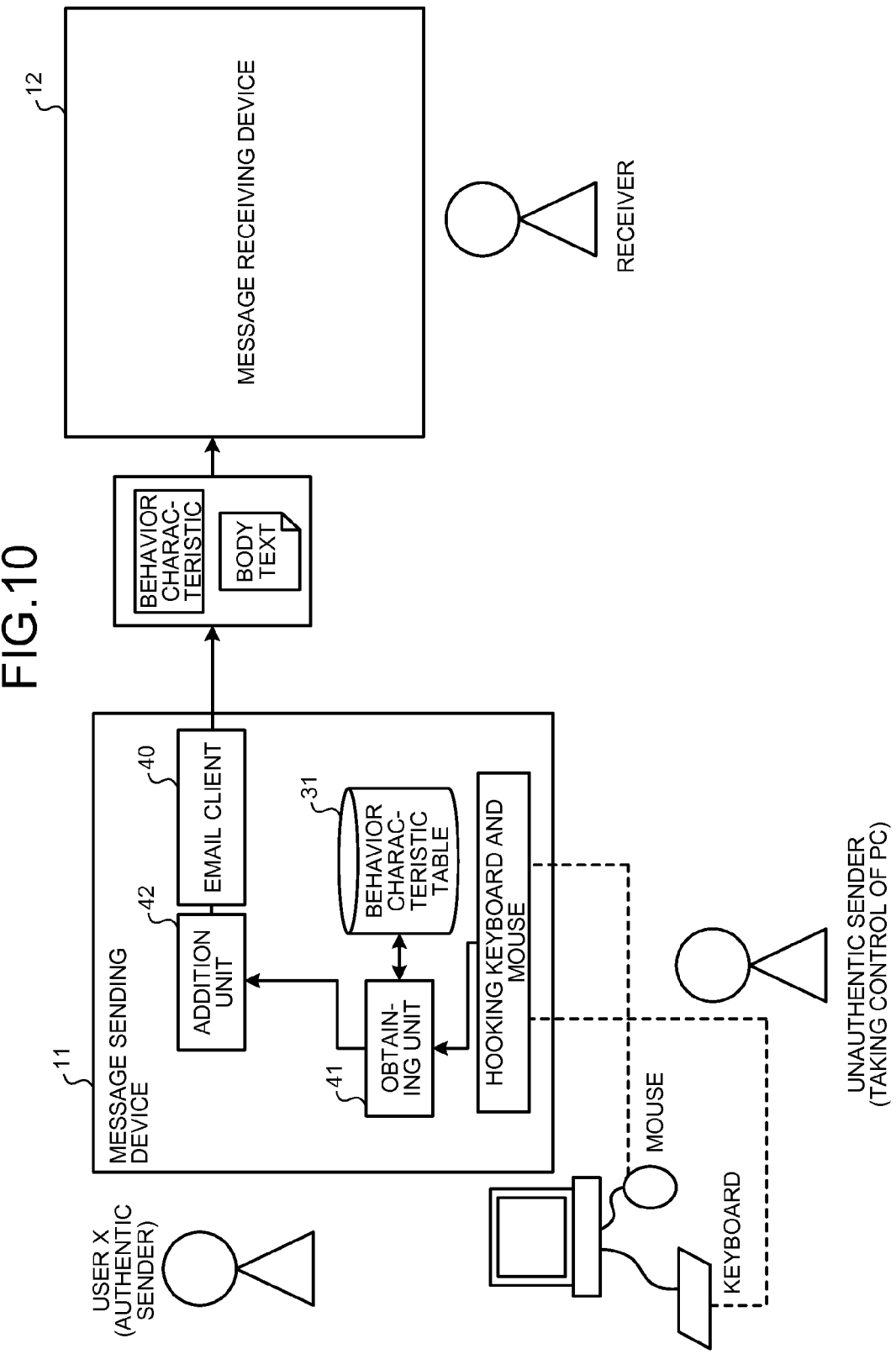
FIG. 10 is a diagram schematically illustrating an example of a process flow when sending an email.

Next, an operation of the system 10 according to the present embodiment when sending/receiving an email will be described. FIG. 10 is a diagram schematically illustrating an example of a process flow when sending an email.

When sending an email, a user inputs the body text of the email by using the input unit 22 such as the mouse and the keyboard of the message sending device 11. The message sending device 11 hooks (monitors) the particulars of operations performed on the input unit 22 such as the keyboard and the mouse, thus obtaining the operation log. The obtaining unit 41 obtains, from the operation log, an operation characteristic of an input operation during creating an email. For example, based on the operation log, the obtaining unit 41 searches for a characteristic phrase, such as a keyword of a high frequency of appearance from among email expressions of the sender, or a character string registered in the user dictionary data 30, thereby obtaining the operation characteristic when inputting the characteristic phrase. Note that the characteristic phrase may be defined based on term frequency-inverse document frequency (TF-IDF). TF represents the number of times a particular word appears in a document. IDF represents the natural logarithm of the number of documents including the word therein from among all documents in general. For example, IDF is obtained by collecting a large number of documents. TF-IDF is obtained by multiplying the value of TF by the value of IDF. TF-IDF indicates how characteristic a word appearing in a document is. For example, a characteristic phrase is defined as being a phrase whose TF-IDF is greater than or equal to a predetermined threshold. This threshold may be allowed to be set from outside. From the operation log, the obtaining unit 41 also obtains, as an operation characteristic, the position of operation within the button on the screen when instructing to send the email.

Figure 11:
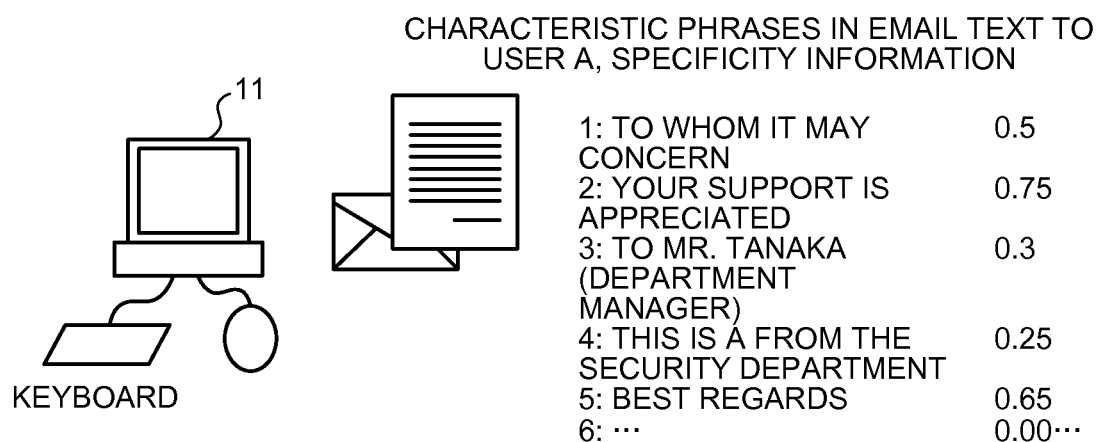
FIG. 11 is a diagram illustrating an example of a content of an email and an operation characteristic.

FIG. 11 is a diagram illustrating an example of a content of an email and an operation characteristic. It is assumed in the example of FIG. 11 that "To whom it may concern," "Your support is appreciated," "To Mr. Tanaka (Department Manager)," "This is A from the security department," and "Best regards" have been searched for as characteristic phrases. The obtaining unit 41 obtains the operation characteristic based on operation particulars when each characteristic phrase was input. The example of FIG. 11 illustrates the characteristic value obtained by numerically expressing (through a predetermined conversion) the input pattern when each characteristic phrase was input. In the example of FIG. 11, the characteristic value for "To whom it may concern" as a characteristic phrase is represented to be "0.5."

Referring back to FIG. 10, when sending an email by the email client 40, the addition unit 42 adds, to the header of the email, each state number during creating the email associated with the characteristic value of the steady state during creating the email. The email with the state number and the operation characteristic added to the header thereof is sent to the destination by the email client 40. In the example of FIG. 10, it is sent to the message receiving device 12.

Figure 12:
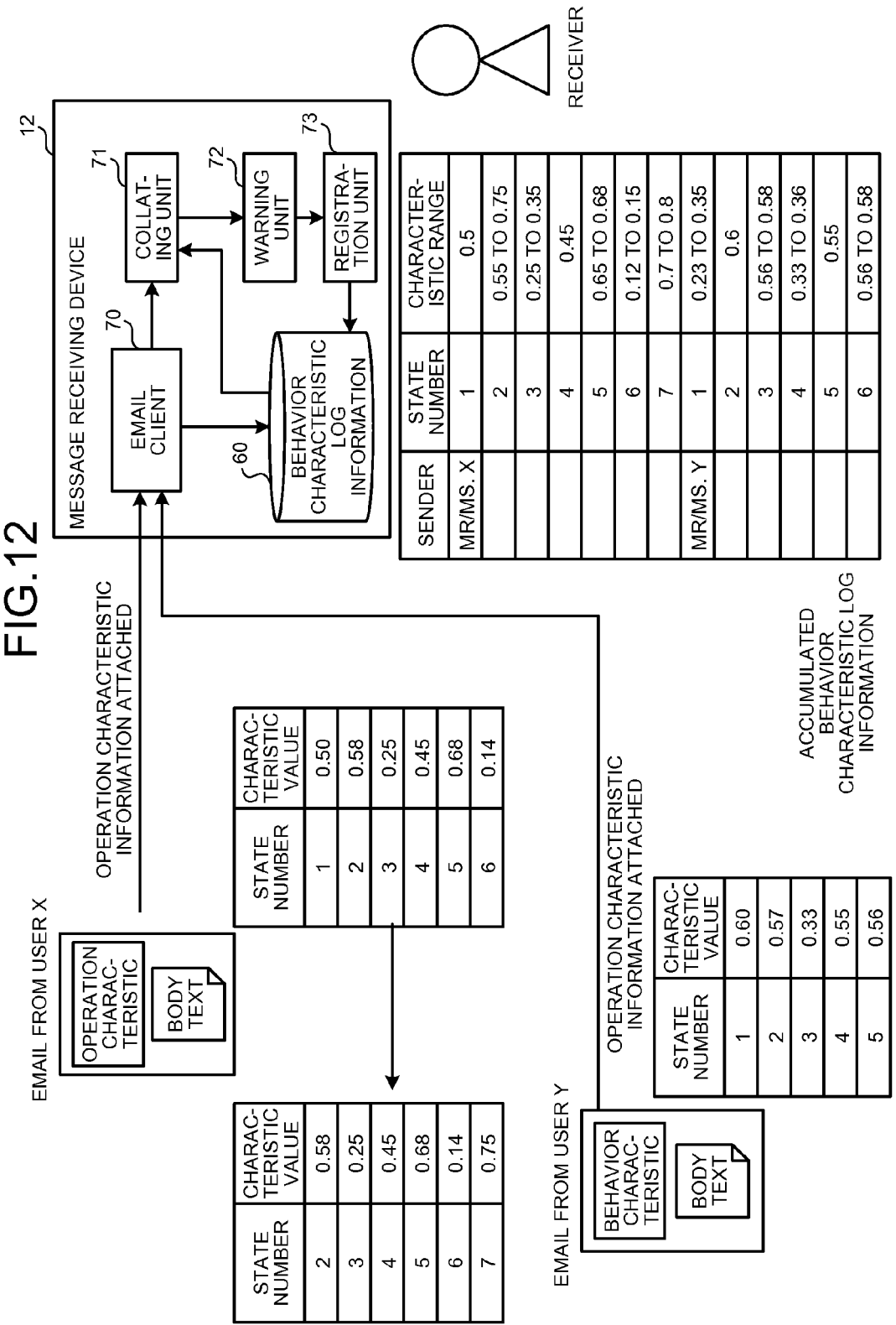
FIG. 12 is a diagram schematically illustrating an example of a process flow when receiving an email.

FIG. 12 is a diagram schematically illustrating an example of a process flow when receiving an email. The message receiving device 12 receives an email by means of the email client 70. The collating unit 71 collates the characteristic value of each state number in the header of the email received by the email client 70 with the characteristic range of the same state number stored in the behavior characteristic log information 60. For example, if an email is received from user X, the collating unit 71 collates by determining whether the characteristic value of the received email is within the characteristic range of user X stored in the behavior characteristic log information 60. If an email is received from user Y, the collating unit 71 collates by determining whether the characteristic value of the received email is within the characteristic range of user Y stored in the behavior characteristic log information 60. The collating unit 71 determines that the characteristic value is valid if the characteristic value added to the header of the email is within the characteristic range stored in the behavior characteristic log information 60.

The warning unit 72 issues a warning depending on the collation result of the collating unit 71. For example, when the characteristic value of each state number added to the email is outside the characteristic range by a predetermined proportion or more, the warning unit 72 determines that it is an email from an invalid user and displays a warning message on the display unit 51. The predetermined proportion is 30 percent, for example. Note that the predetermined proportion may be allowed to be adjusted from outside.

The registration unit 73 registers data in the behavior characteristic log information 60. For example, if a button indicating that the sender is valid is selected on the screen where a warning is displayed, the registration unit 73 registers the data in the behavior characteristic log information 60. For example, the registration unit 73 registers the characteristic range for each state number in the behavior characteristic log information 60 so that the characteristic value of each state number added to the received email is within the characteristic range.

Now, even if users make inputs of the same content, the input operation differs for each user. Therefore, even if one receives a targeted email attack spoofing the sender email address from an unauthorized user, for example, the characteristic value of each state number attached to the email will be significantly different from the characteristic value of a valid user. Therefore, it is possible to identify emails from unauthorized users.

For example, in FIG. 10, if the message sending device 11 of a valid user is operated by an unauthorized user via remote control or direct control so as to create and send a spoofed email, the characteristic value of each state number attached to the email will be significantly different from the characteristic value of the valid user. Thus, it is possible to identify emails from unauthorized users. That is, the message receiving device 12 can identify spoofed emails sent from unauthorized users, and emails sent from unauthorized users by using the message sending device 11 of a valid user.

As described above, when sending an email, the message sending device 11 sends it while attaching, to the email, the operation characteristic during creating the email. Thus, a user sending an email is not requested to perform any special action other than to create the email. Thus, it is possible to suppress an increase of the burden on the user. With the message receiving device 12, it is possible to identify emails from unauthorized users by collating the characteristic information of the operation characteristic attached to the email. The system 10 sequentially assigns state numbers to operation characteristics, and sends the state number of the steady state included in the email and the operation characteristic to the message receiving device 12. The state number and the operation characteristic sent with the email vary depending on the content of the email. In the example of FIG. 12, the operation characteristics sent from user X change from state numbers "1" to "6" to state numbers "2" to "7." Thus, with the message receiving device 12, the state number representing an operation characteristic is a simple figure, and it is not possible to identify what operation is represented by an operation characteristic, thereby preventing unnecessary information leakage.

Process Flow

Figure 13:
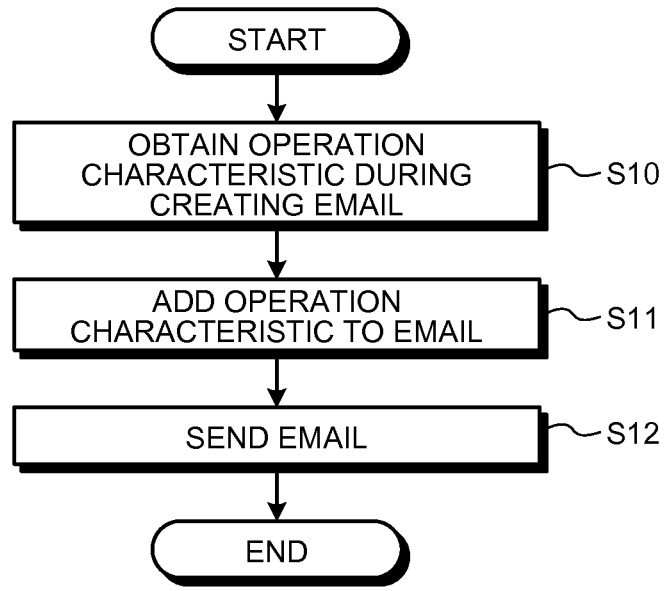
FIG. 13 is a flow chart illustrating an example of a procedure of a sending process.

Next, the flow of the sending process in which the message sending device 11 of the present embodiment sends an email will be described. FIG. 13 is a flow chart illustrating an example of a procedure of a sending process. The sending process is performed at a predetermined timing, for example, a timing when an instruction is given to send an email, for example.

As illustrated in FIG. 13, from the operation log during creating an email, the obtaining unit 41 obtains the operation characteristic of the input operation during creating the email (step S10). The addition unit 42 adds, to the header of an email which has been instructed to be sent, the state number of the operation characteristic during creating the email and the characteristic value of the steady state so that they are associated with each other (step S11). The email client 40 transmits the email which has been instructed to be sent (step S12), and ends the process.

Figure 14:
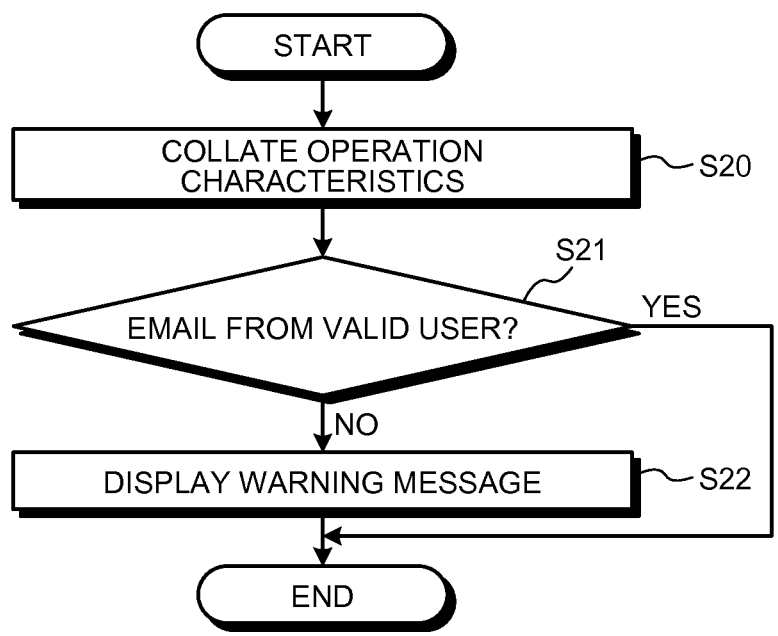
FIG. 14 is a flow chart illustrating an example of a procedure of a receiving process.

Next, the flow of the receiving process in which the message receiving device 12 of the present embodiment receives an email will be described. FIG. 14 is a flow chart illustrating an example of a procedure of a receiving process. The receiving process is performed at a predetermined timing, for example, a timing when the email is received by the email client 70, for example.

As illustrated in FIG. 14, the collating unit 71 collates the operation characteristic added to the email received by the email client 70 with the registered operation characteristic stored in the behavior characteristic log information 60 (step S20). As a result of the collation, the collating unit 71 determines whether or not the email is an email from a valid user (step S21). If it is an email from a valid user (Yes at step S21), the process ends.

If it is not an email from a valid user (No at step S21), the warning unit 72 displays a warning message on the display unit 51 (step S22), and the process ends.

Effects

As described above, the message sending device 11 of the present embodiment obtains an operation characteristic during creating an email. The message sending device 11 adds the obtained operation characteristic to the email. The message sending device 11 sends the message, to which the operation characteristic has been added, to the destination of the message. On the other hand, the message receiving device 12 of the present embodiment receives the message, to which the operation characteristic during creating the message has been added. The message receiving device 12 collates the operation characteristic added to the received message with the registered operation characteristic. The message receiving device 12 issues a warning depending on the collation result. Thus, the message sending device 11 and the message receiving device 12 can identify emails from unauthorized users while suppressing an increase of the burden on the user. That is, it is possible to identify spoofed emails sent from unauthorized users, and emails sent from unauthorized users by using the message sending device 11 of a valid user.

The message sending device 11 of the present embodiment adds, to an email, identification information for each operation characteristic, and the characteristic value representing the operation characteristic. On the other hand, the message receiving device 12 of the present embodiment receives a message, to which identification information for each operation characteristic and the characteristic value representing the operation characteristic have been added. The message receiving device 12 collates the characteristic value for each identification information. Thus, the message sending device 11 and the message receiving device 12 can identify emails from unauthorized users while preventing unnecessary information leakage.

The message sending device 11 of the present embodiment obtains, as an operation characteristic, either a key input operation characteristic when inputting a predetermined phrase, or an operation characteristic of an operation performed on the screen. Thus, the message receiving device 12 can obtain an operation characteristic indicating a characteristic of a user.

It is assumed that the message sending device 11 of the present embodiment uses one or both of phrases of high input frequencies and phrases registered in the user registration dictionary. The message receiving device 12 can obtain an operation characteristic by a phrase with which a characteristic of a user is likely to represent when inputting text.

The message receiving device 12 of the present embodiment receives a message, to which identification information for each operation characteristic and the characteristic value representing the operation characteristic have been added. The message receiving device 12 collates the characteristic value for each identification information.

[b] Second Embodiment

Next, a second embodiment will be described. The second embodiment is directed to a case where when sending an email, the message sending device 11 issues a warning by collating by determining whether or not it is an email of a valid user.

Configuration of Message Sending Device

Figure 15:
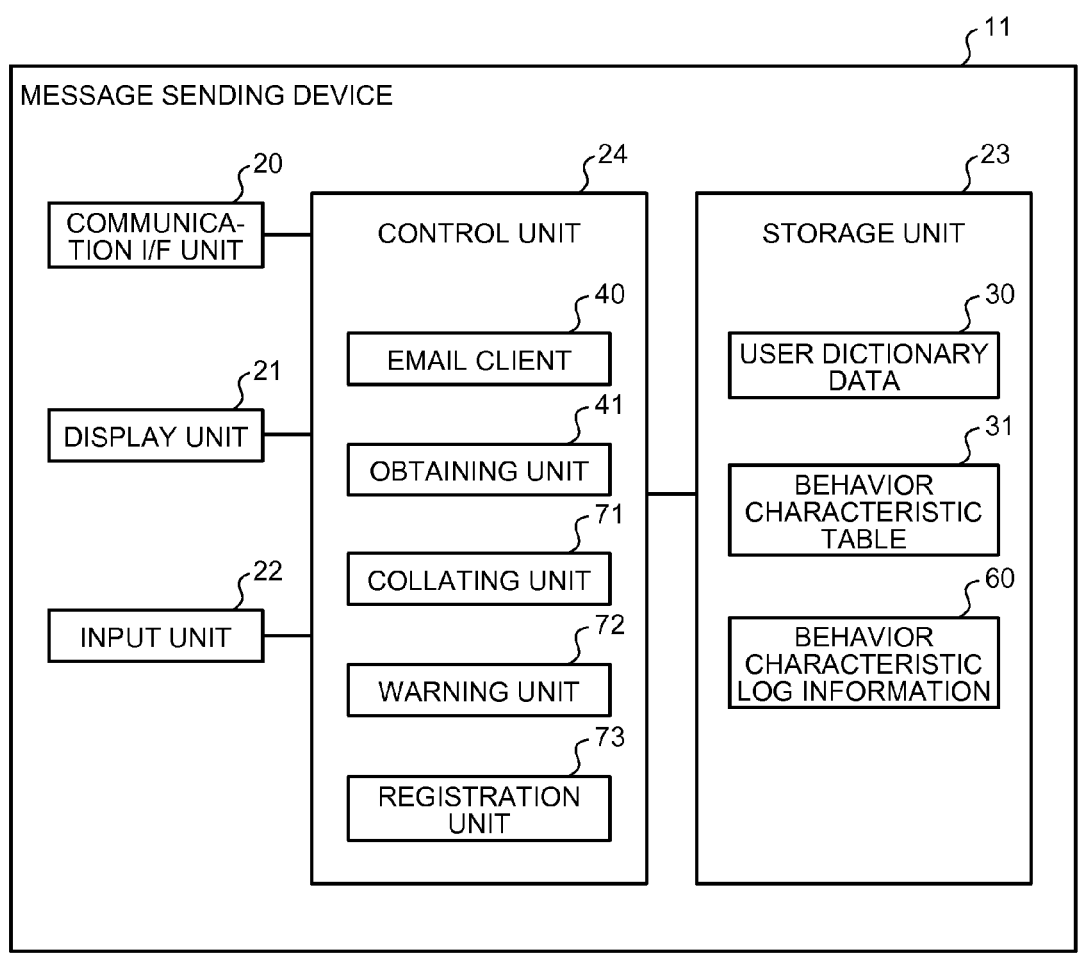
FIG. 15 is a block diagram illustrating a functional configuration of a message sending device.

The message sending device 11 according to the second embodiment will be described. FIG. 15 is a block diagram illustrating a functional configuration of the message sending device. Note that like elements to those of the message sending device 11 of the first embodiment illustrated in FIG. 2 and the message receiving device 12 of the first embodiment illustrated in FIG. 8 will be denoted by like reference numerals, and the following description will focus primarily on what are different therefrom. As illustrated in FIG. 15, the storage unit 23 of the message sending device 11 stores the behavior characteristic log information 60. In the present embodiment, the operation characteristic for each user using the message sending device 11 is stored in the behavior characteristic log information 60. For example, when the message sending device 11 is shared by a plurality of users, the operation characteristic for each user ID or each user is stored in the behavior characteristic log information 60.

The control unit 24 of the message sending device 11 does not include the addition unit 42, but further includes the collating unit 71, the warning unit 72, and the registration unit 73.

When sending an email, the collating unit 71 collates the operation characteristic during creating the email with the operation characteristic of the user creating the email stored in the behavior characteristic log information 60.

The warning unit 72 issues a warning depending on the collation result of the collating unit 71. For example, if the characteristic value of each state number added to the email is outside the characteristic range, the warning unit 72 determines that the email has been created by an invalid user, and displays a warning message on the display unit 51. Note that the warning is not limited to this. For example, the warning unit 72 may add, to the email to be sent, information indicating that the email has been created by an invalid user. For example, the warning unit 72 may notify the administrator terminal, or the like, of the operation having been performed by an invalid user. For example, the warning unit 72 may stop sending the email of the invalid user.

The registration unit 73 registers, in the behavior characteristic log information 60, the operation characteristic of a user who has been determined to be a valid user. For example, in the present embodiment, a button that allows the user to indicate that the sender of the email is valid is provided on the screen where the warning message is displayed. If the button for indicating that the sender is valid is selected, the registration unit 73 registers the characteristic range for each state number in the behavior characteristic log information 60 so that the characteristic value of each state number added to the received email is within the characteristic range. Thus, when an email is later received with the same operation characteristic, it is determined to be from a valid user.

Effects

As described above, the message sending device 11 of the second embodiment obtains an operation characteristic during creating an email. The message sending device 11 collates the obtained operation characteristic with the registered operation characteristic. The message sending device 11 issues a warning depending on the collation result. Thus, the message sending device 11 can identify emails from unauthorized users while suppressing an increase of the burden on the user.

[c] Third Embodiment

Now, while embodiments of the disclosed device have been described above, the disclosed technique can be carried out in various different forms other than the embodiments set forth above. Alternative embodiments included in the present invention will now be described below.

For example, while the embodiments described above are directed to cases where an email is used as a message, the disclosed device is not limited to this. For example, the message may be a message to be exchanged by messenger software or by a short message service (SMS), or the like. That is, the message may be anything as long as it can be electronically exchanged between users.

While the embodiments described above are directed to cases where an operation characteristic from a keyboard input operation or an operation using a mouse is obtained as an operation characteristic during creating a message, the disclosed device is not limited to this. For example, when the message sending device 11 is a portable terminal device such as a tablet terminal, a smartphone, or a PDA, an attitude-wise operation characteristic, such as the degree of inclination, during creating a message may be obtained by using various sensors such as an acceleration sensor or a gyrosensor provided in the portable terminal device. When a user makes an input on a portable terminal device, the user uses the portable terminal device in such an attitude that it is easy for the user to operate. Therefore, the attitude in which a portable terminal device is used differs for each user. Thus, it is possible to determine whether or not it is a valid user based on an attitude-wise operation characteristic.

While the embodiments described above are directed to a case where the behavior characteristic log information 60 is stored in the message receiving device 12, the disclosed device is not limited to this. For example, the behavior characteristic log information 60 may be stored in the email server 14, and the email server 14 may collate to determine whether or not the received email is one sent from a valid user. Since the message receiving device 12 collates an operation characteristic included in the received email with a registered operation characteristic received in the past, it is not possible to collate for a user from which an email is received for the first time. In view of this, the email server 14 may store operation characteristics included in emails sent to different users so that for a user from which an email is received for the first time, the message receiving device 12 can make an inquiry to the email server 14 for an operation characteristic to thereby obtain an operation characteristic. An operation characteristic included in an email received by the message receiving device 12 may be sent to the email server 14 so that the email server 14 can collate using the operation characteristic.

In the embodiments described above, an email is not limited to one that is sent to an individual user, but the present invention is also applicable to groups and mailing lists. In this case, for example, information representing the sender is also added to the header, or the like, of the email, and the message receiving device 12 collates using the operation characteristic of the user who is the sender.

Various components of various devices illustrated in the figures are functionally conceptual, and they do not need to be physically configured as illustrated. That is, specifically how the devices or the components are dispersed/integrated is not limited to what is illustrated in the figures, and all or some of them may be functionally or physically dispersed/integrated in any groups in accordance with various loads, status of use, etc. For example, different processing units, such as the obtaining unit 41 and the addition unit 42 of the message sending device 11, and the collating unit 71, the warning unit 72 and the registration unit 73 of the message receiving device 12, may be integrated together as necessary. The process of any processing unit may be divided into processes of a plurality of processing units, as necessary. For each device, some or all of the processing units may be integrated together as necessary. Moreover, all or any collection of the process functions performed by the processing units may be implemented by a CPU or a program to be analyzed/executed by the CPU, or may be implemented as wired-logic hardware.

Program

Figure 16:
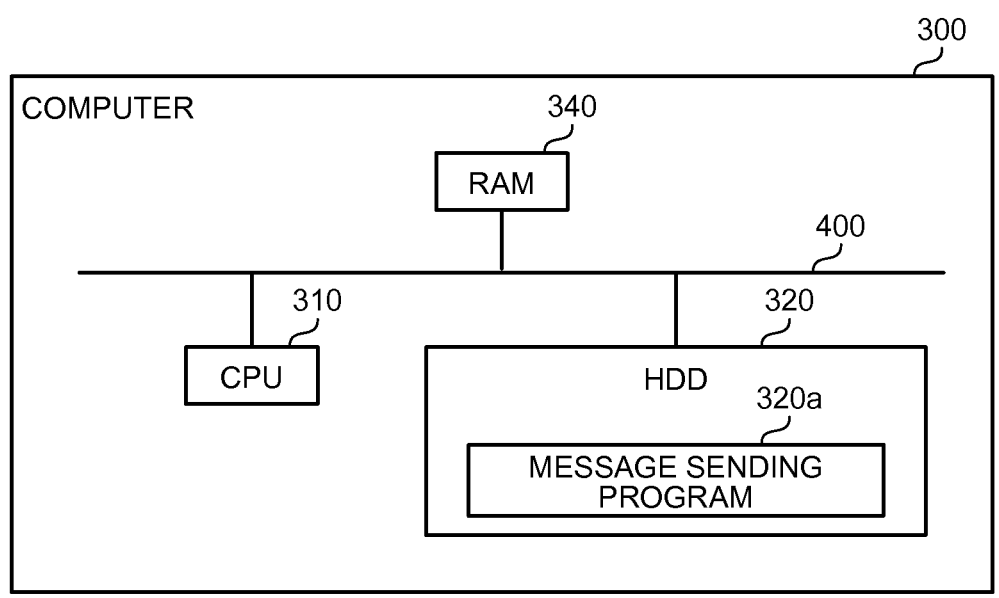
FIG. 16 is a diagram illustrating a computer for executing a message sending program.

Various processes illustrated in the embodiments described above may be realized by executing programs provided in advance by means of a computer system such as a personal computer or a workstation. In view of this, an example of a computer system capable of executing a program having similar functions to those of the embodiments described above will be described below. FIG. 16 is a diagram illustrating a computer for executing a message receiving program.

As illustrated in FIG. 16, a computer 300 includes a Central Processing Unit (CPU) 310, a Hard Disk Drive (HDD) 320, and a Random Access Memory (RAM) 340. These units 300 to 340 are connected together via a bus 400.

A message sending program 320*a* capable of implementing similar functions to the processing units of the email client 40, the obtaining unit 41, and the addition unit 42 of the message sending device 11 described above is stored in advance in the HDD 320. Note that the message sending program 320*a* may be divided into pieces as necessary.

The HDD 320 stores various information. For example, the HDD 320 stores the OS or various data used in the processes.

Then, the CPU 310 reads out the message sending program 320*a* from the HDD 320, and executes the message sending program 320*a*, thereby performing similar operations to those of the processing units of the above embodiments. That is, the message sending program 320*a* performs similar operations to those of the email client 40, the obtaining unit 41, and the addition unit 42 of the message sending device 11.

Note that the message sending program 320*a* described above does not need to be stored in the HDD 320 from the beginning.

For example, the program may be stored in a "portable physical medium" to be inserted into the computer 300, such as a flexible disk (FD), a CD-ROM, a DVD disc, a magneto-optical disk, or an IC card. Then, the computer 300 may read out the program therefrom to execute the program.

Furthermore, the program may be stored in "another computer (or server)" connected to the computer 300 via a public network, the Internet, a LAN, a WAN, or the like. Then, the computer 300 may read out the program therefrom to execute the program.

Figure 17:
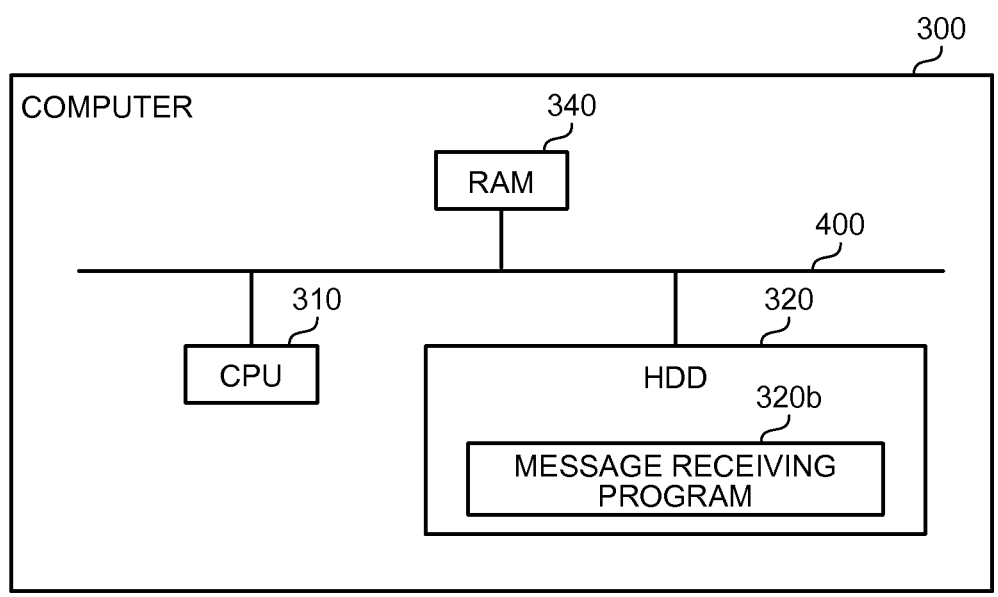
FIG. 17 is a diagram illustrating a computer for executing a message receiving program.

FIG. 17 is a diagram illustrating a computer for executing a message receiving program. Note that like elements to those illustrated in FIG. 16 will be denoted by like reference numerals, and the following description will focus primarily on what are different therefrom.

A message receiving program 320*b* capable of implementing similar functions to the processing units of the collating unit 71, the warning unit 72, and the registration unit 73 of the message receiving device 12 described above is stored in advance in the HDD 320. Note that the message receiving program 320*b* may be divided into pieces as necessary.

The HDD 320 stores various information. For example, the HDD 320 stores the OS or various data used in the processes.

Then, the CPU 310 reads out the message receiving program 320*b* from the HDD 320, and executes the message receiving program 320*b*, thereby performing similar operations to those of the processing units of the above embodiments. That is, the message receiving program 320*b* performs similar operations to those of the collating unit 71, the warning unit 72, and the registration unit 73 of the message receiving device 12.

Note that the message receiving program 320*b* described above does not need to be stored in the HDD 320 from the beginning.

For example, the program may be stored in a "portable physical medium" to be inserted into the computer 300, such as a flexible disk (FD), a CD-ROM, a DVD disc, a magneto-optical disk, or an IC card. Then, the computer 300 may read out the program therefrom to execute the program.

Furthermore, the program may be stored in "another computer (or server)" connected to the computer 300 via a public network, the Internet, a LAN, a WAN, or the like. Then, the computer 300 may read out the program therefrom to execute the program.

According to one aspect of the present invention, it is possible to identify messages from unauthorized users while suppressing an increase of the burden on the user.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A message sending device comprising:
   a memory that stores characteristic phrases whose frequencies of appearance are greater than or equal to a predetermined threshold, the memory storing each of the characteristic phrases associated with identification information for identifying an operation characteristic; and
   a processor that executes a process including:
   extracting a characteristic phrase of the stored characteristic phrases and extracting input operations of the characteristic phrase that are included in a message and stored in the memory during creating of the message;
   obtaining identification information associated with the characteristic phrase and a characteristic value representing a numerical expression of the input operations of the characteristic phrase during the creating of the message when the characteristic phrase and the input operations of the characteristic phrase are extracted at the extracting;
   adding, to the message, the identification information and the characteristic value obtained at the obtaining when the characteristic phrase and the input operations of the characteristic phrase are extracted at the extracting; and
   sending the message, to which the identification information and the characteristic value have been added at the adding, to a destination of the message when the characteristic phrase and the input operations of the characteristic phrase are extracted at the extracting.

2. The message sending device according to claim 1, wherein the obtaining includes obtaining, as the operation characteristic, any one of an operation characteristic of a key input during inputting the characteristic phrase, an operation characteristic of an operation performed on a screen, and an attitude-wise operation characteristic.

3. The message sending device according to claim 2, wherein the characteristic phrase is one or both of a phrase of a high input frequency and a phrase that has been registered in a user registration dictionary.

4. A message checking device comprising:
   a memory that stores identification information of a characteristic phrase whose frequency of appearance is greater than or equal to a predetermined threshold and a characteristic value representing a numerical expression of input operations of the characteristic phrase; and
   a processor that executes a process including:
   obtaining, from a message during creating of the message, a state number representing input operations of the characteristic phrase included in the message and a characteristic value representing the numerical expression of the input operations of the characteristic phrase for each user when the characteristic phrase is input by user;
   collating the state number and the characteristic value corresponding to the characteristic phrase obtained at the obtaining with the identification information and characteristic value stored in the memory; and
   issuing a warning depending on a collation result of the collating.

5. A non-transitory computer-readable recording medium having stored therein a program that causes a computer to execute a message checking process comprising:
   storing identification information of a characteristic phrase whose frequency of appearance is greater than or equal to a predetermined threshold and a characteristic value representing a numerical expression of input operations of the characteristic phrase; and
   obtaining, from a message during creating of the message, a state number representing input operations of the characteristic phrase included in the message and a characteristic value representing the numerical expression of the input operations of the characteristic phrase for each user when the characteristic phrase is input by user;
   collating the state number and the characteristic value corresponding to the characteristic phrase with the identification information and characteristic value stored in the memory; and
   issuing a warning depending on a collation result.

6. A message checking method comprising:
   storing identification information of a characteristic phrase whose frequency of appearance is greater than or equal to a predetermined threshold and a characteristic value representing a numerical expression of input operations of the characteristic phrase; and
   obtaining, from a message during creating of the message by a processor of a message sender, a state number representing input operations of the characteristic phrase included in the message and a characteristic value representing the numerical expression of the input operations of the characteristic phrase for each user when the characteristic phrase is input by user;
   adding the obtained state number and the characteristic value to the message by the processor of the message sender;
   sending the message, to which the state number and the characteristic value has been added, to a destination of the message by the processor of the message sender;
   receiving the message by a processor of a message receiver;
   collating the state number and the characteristic value added to the received message with the identification information and characteristic value by the processor of the message receiver; and
   issuing a warning depending on a collation result by the processor of the message receiver.

* * * * *